Aug. 6, 1929.  C. C. FARMER  1,723,144
TRAIN CONTROL SPEED GOVERNOR
Filed June 17, 1927   3 Sheets-Sheet 1
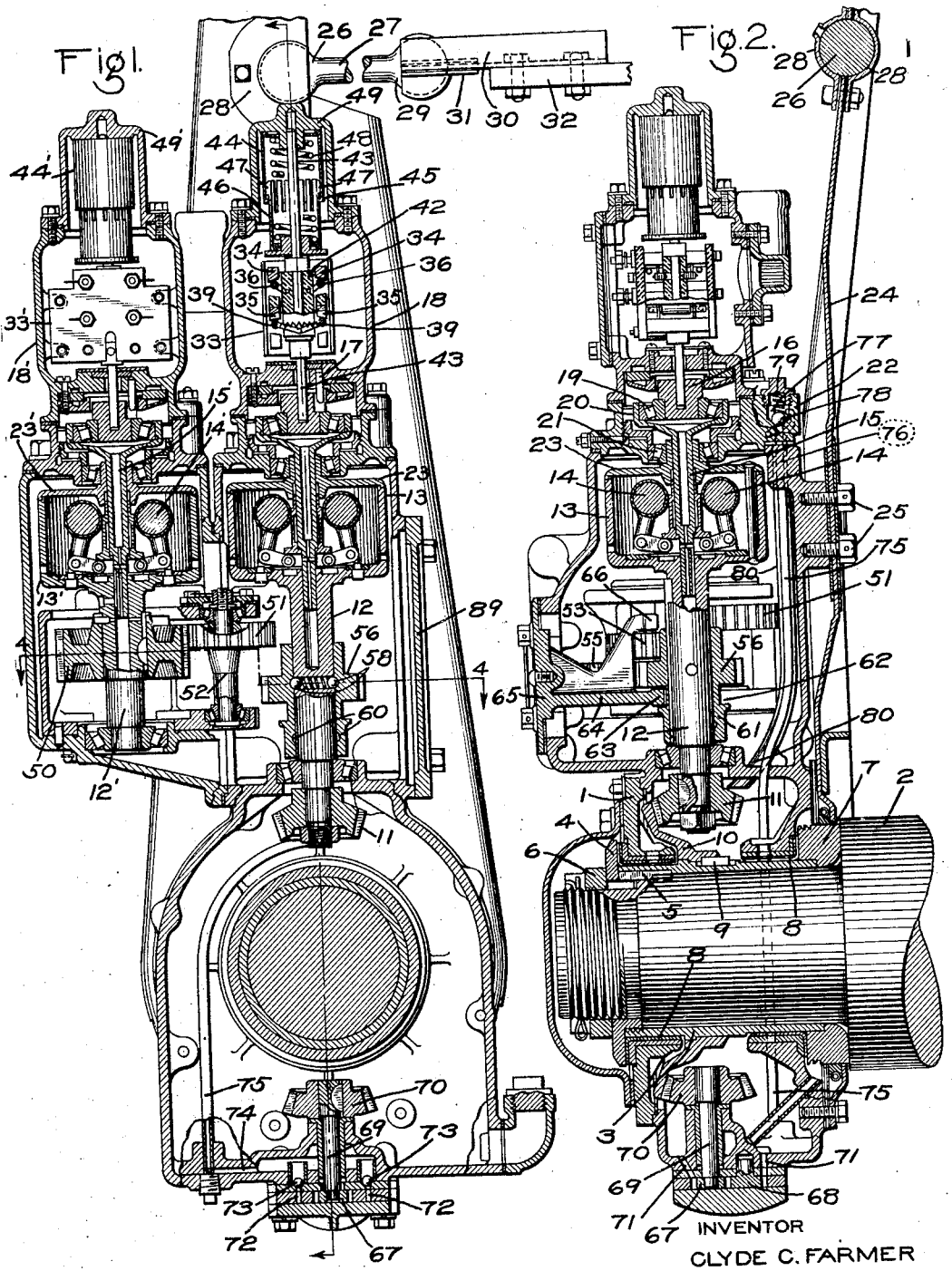
INVENTOR
CLYDE C. FARMER
BY Wm. M. Cady
ATTORNEY Aug. 6, 1929.  C. C. FARMER  1,723,144
TRAIN CONTROL SPEED GOVERNOR
Filed June 17, 1927   3 Sheets-Sheet 2
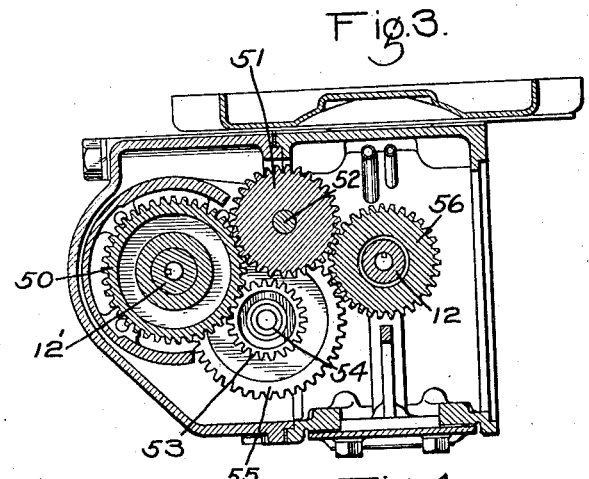
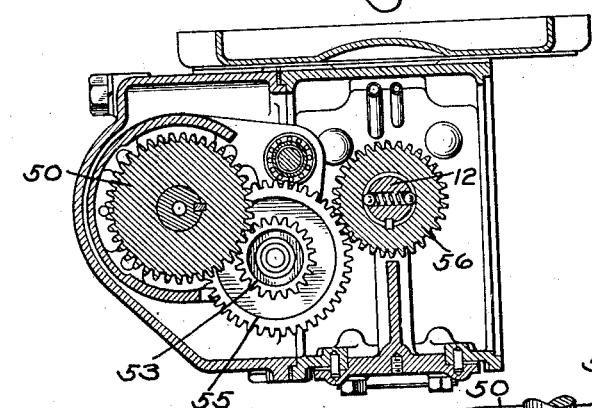
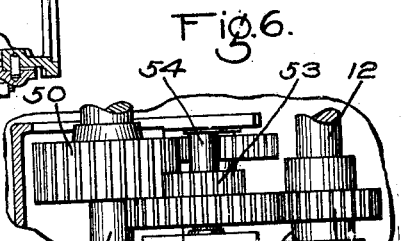
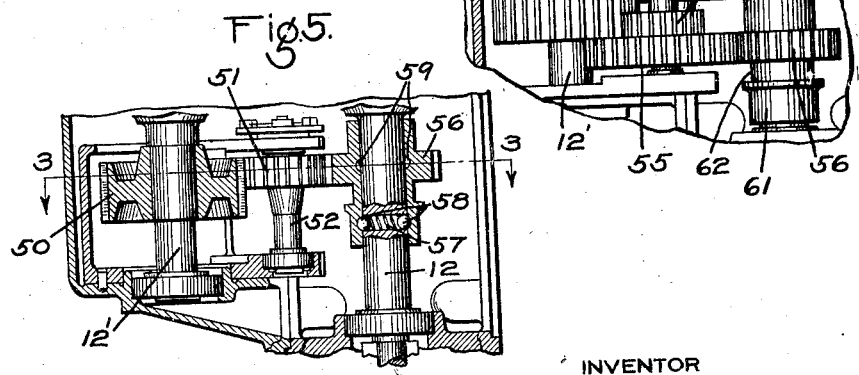
INVENTOR
CLYDE C. FARMER
BY Wm. M. Cady
ATTORNEY Aug. 6, 1929.   C. C. FARMER   1,723,144
TRAIN CONTROL SPEED GOVERNOR
Filed June 17, 1927   3 Sheets-Sheet 3
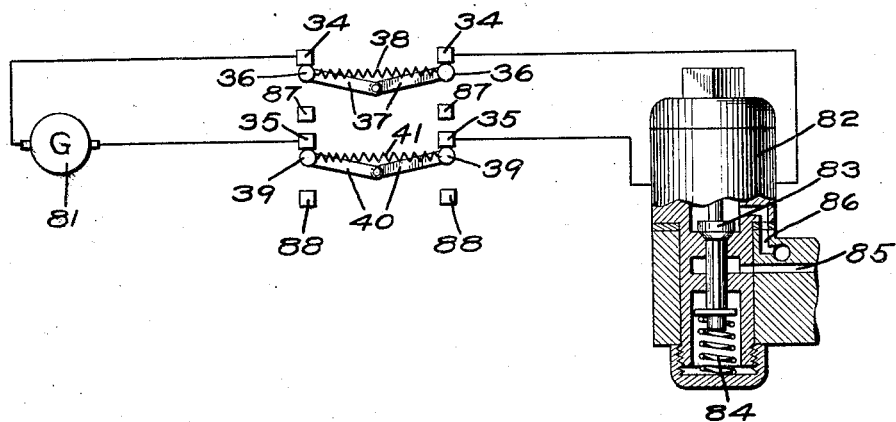
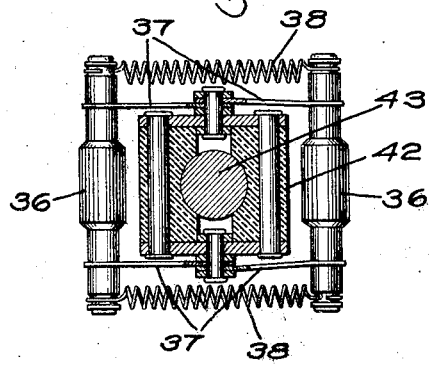
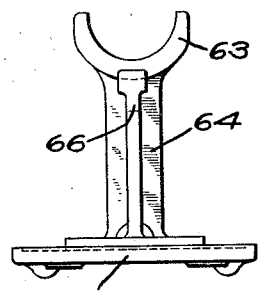
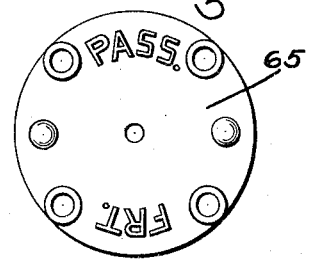
INVENTOR
CLYDE C. FARMER
BY Wm. M. Cady
ATTORNEY Patented Aug. 6, 1929.

1,723,144

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRAIN-CONTROL SPEED GOVERNOR.

Application filed June 17, 1927. Serial No. 199,506.

This invention relates to a speed governor mechanism for automatic train control equipments and adapted to be controlled by the speed of the train for limiting the speed at which the train may run.

With some train control installations, only one speed limit is provided, in others two may be required, and in others three speed limits, such as high speed, medium speed, and low speed.

One object of my invention is to provide a speed governor mechanism having a primary speed governor device adapted for one speed limit control and so constructed that one or more auxiliary governor devices may readily be added to the primary governor device, when the equipment is intended to operate at two or more speed limits.

In freight service, the speed limits desired may be different from the speed limits desired for passenger service, and another object of my invention is to provide a speed governor mechanism having means for adjusting the mechanism to operate at different speed limits according to the service.

Other objects and advantages will appear in the following more detailed description of the invention.

In the accompanying drawings; Fig. 1 is a central sectional view of a speed control governor mechanism embodying my invention; Fig. 2 is a central sectional view of the mechanism shown in Fig. 1, taken on a plane at right angles to the plane of Fig. 1; Fig. 3 a section on the line 3—3 of Fig. 5; Fig. 4 a section on the line 4—4 of Fig. 1; Fig. 5 a section of the change speed gear portion of the mechanism, showing the gears shifted to a different position from that shown in Fig. 1; Fig. 6 a view of the change speed gear portion, showing certain of the gears which were omitted in Fig. 1 for the sake of clearness; Fig. 7 a diagrammatic view showing the circuit controlled by the primary governor switch device; Fig. 8 a plan view of the switch contact mechanism; Fig. 9 a plan view of the gear locking device; and Fig. 10 a face view of said gear locking device.

The primary speed governor device may comprise a housing 1 adapted to be mounted on the end of an axle of the locomotive, such as the pony truck axle 2. The end of the axle is made of reduced diameter, slightly tapered, and a bushing 3 is applied, the bushing being held in place by a collar 4 and being also keyed to the axle by a spline 5. The collar 4 is held in place by a nut 6 having threaded engagement on the end of the axle. A ring 7 at the inner end of the bearing also rotates with the axle, the inner end of the bushing 3 being disposed in an annular groove cut in the ring. Suitable babbitt liners 8 are interposed between the housing 1 and the bushing 3.

Secured to the bushing 3 by a spline 9 is a bevel gear 10, meshing with a bevel pinion 11, and the pinion 11 is secured to the lower end of a driven shaft 12. At its upper end, the shaft 12 carries a speed governor receptacle 13 and within the receptacle are mounted governor balls 14. The operation of the governor balls as the speed of rotation is increased is adapted to impart vertical movement to a shaft 15. The upper end of the shaft 15 is provided with a receptacle 20 for receiving the lower portion of a non-rotating member 16, the member being prevented from rotating by a pin 17 carried by the switch housing 18.

A roller bearing 19 is interposed between the walls of the receptacle 20 and the member 16 and a roller bearing 21 is provided between the walls of a casing section 22 and the reduced bearing end of the cover plate 23 of the receptacle 13.

In order to hold the governor device unit against rotation about the axle 2, a plate member 24 is secured by bolts 25 to a wall of the housing 1, and at the upper end the member 24 is provided with a socket for receiving the ball-shaped end 26 of a rod 27, the end 26 being held in place by cover plates 28. At the opposite end, the rod 27 is provided with a ball-shaped portion 29 adapted to engage in a ball-shaped socket in a plate 30, the portion 29 being held in place by a cover plate 31. The plate 31 is secured to a portion 32 of the locomotive. The rod 27 holds the governor device unit against rotation about the axle 2, but the ball and socket connections of the rod permit vertical and lateral movement of the housing with the axle without straining the governor device.

Disposed within the switch housing 18 is a switch mechanism comprising a contact receptacle 33 containing pairs of switch contacts 34 and 35.

A toggle switch is provided having connected contacts 36 carried by toggle links 37 and coil springs 38 under tension tending to pull the contacts together. A similar toggle switch is provided for the contacts 35 having connected contacts 39 carried by toggle links 40 and a coil spring 41.

The toggle links are pivotally connected to a movable member 42 having a downwardly extending rod 43 which extends into a bore of the member 16. The rod 43 also extends upwardly and carries a spring cage comprising a cylindrical section 44 having at its lower end an inturned annular shoulder 45. A cylindrical section 46 has telescopic engagement within the section 44, and the upper portion of the section 46 is longitudinally slotted to form spring clips having outwardly extending flukes 47. A coil spring 48 is disposed within the sections and the sections are assembled by springing the section 46 into the section 44, the outer ends of the flukes 47 being beveled for this purpose. The engagement of the flukes 47 with the shoulder 45 then prevents separation of the sections.

The upper end of the rod 43 engages in a bore provided in a cap member 49 which is secured to the switch housing 18.

The housing 1 of the primary governor device is provided with opposite openings through which auxiliary governor devices may be operatively connected to the primary governor device. In the drawings, one such auxiliary governor device is shown applied to the primary governor device, and since the construction is substantially the same as that of the primary governor device, no further description is deemed necessary, except as to the gear means by which the auxiliary governor device is operatively connected to the primary governor device.

Secured to the driver shaft 12' of the auxiliary governor device is a gear 50 and meshing with said gear is a gear 51 carried by a stub shaft 52. Also meshing with the gear 50 is a gear 53 secured to a stub shaft 54 and also secured to the stub shaft 54 is a gear 55.

Slidably mounted on and keyed to rotate with the shaft 12 is a gear 56 and said gear may be adjusted to two positions, one in which the gear 56 meshes with the gear 51, as shown in Figs. 3 and 5, and the other in which the gear 56 meshes with the gear 55, as shown in Figs. 4 and 6.

In order to lock the gear 56 in either of its two positions, the shaft 12 is provided with a bore, containing a coil spring 57 which acts on balls 58 at its opposite ends. The balls are adapted to engage in corresponding pairs of recesses 59 and 60 in the gear 56. In one position, the balls 58 engage in the recesses 60, as shown in Fig. 5, with the gear 56 meshing with the gear 51, and in the other position the balls 58 engage in the recesses 59, with the gear 56 meshing with the gear 55, as shown in Fig. 6.

In order to further ensure that the gears will be properly positioned, the hub 61 of the gear 56 is provided with an annular groove 62. Adapted to engage in said groove is a yoke 63 carried by an arm 64 and said arm is secured to a cover plate 65. The cover plate 65 is so secured to the housing 1 that the yoke 63 will hold the gear 56 in the position shown in Fig. 2, but when the plate 65 is removed and applied to the housing so that the lower edge of the plate is uppermost, the yoke 63 will engage the groove 62 only if the gear 56 is in the position in which said gear meshes with the gear 55. In order to prevent the possible shifting of the gear 56 from the position shown in Fig. 2 to its upper position, the arm carrying the yoke 63 is provided with an upwardly and inwardly projecting member 66 which is so positioned that it prevents the application of the plate 65, if the gear 56 has been placed in the upper position meshing with the gear 51.

As shown in Fig. 10, the plate 65 may be marked so that when the plate is applied it will indicate either freight or passenger setting, whichever designation reads uppermost.

Lubrication is provided for by employing the chamber within the housing 1, below the axle 2, as an oil sump. A gear pump having gears 67 and 68 is provided and said pump is disposed in the base of the housing 1. The gear 67 is secured to a vertical shaft 69 which is provided at its upper end with a bevel pinion 70 adapted to mesh with the gear 10. The oil pumped by the pump from the oil chamber passes through inlet openings 71 to the pump and thence out through discharge passages 72 controlled by check valves 73 to a passage 74 which leads to a pipe 75.

The pipe 75 supplies oil to a passage 76, from which the oil is distributed to various points by branch passages (not shown).

The passage 76 also leads to a chamber 77, communication to which is controlled by a check valve 78 subject to the pressure of a spring 79. An overflow pipe 80 connects with chamber 77 and is arranged to discharge into the oil sump.

The spring pressed check valve 78 serves to limit the pressure of oil pumped, since if the pump is running at a high speed, tending to pump oil at an excessive pressure, the check valve 78 will lift and relieve the pressure, permitting the oil to flow back to the oil sump through the discharge pipe 80.

As shown in Fig. 7, the switch device of the primary governor device controls a circuit including a source of current, such as a generator 81, and a magnet 82. The magnet 82 controls the operation of a valve 83. When the magnet 82 is energized, the valve 83 is held seated, as shown in Fig. 7. Upon deenergization of the magnet 82, the valve 83 is unseated by the spring 84 and passage 85 is then connected to an atmospheric exhaust port 86. The passage 85 leads to an application valve device (not shown), which is normally held inactive by fluid under pressure, but is adapted when fluid is vented therefrom through passage 85 to shift and cause the operation of mechanism for effecting an application of the brakes.

When the primary governor device is idle or is running at a speed below a predetermined limit, the contacts 36 and 39 are held in engagement with the contacts 34 and 35, as shown in Fig. 7, so that the circuit is closed through the magnet 82 and the magnet is thus maintained energized by current from the generator 81. If the speed of the train exceeds a predetermined limit, the operation of the governor balls 14 will cause a sufficient vertical movement of the member 42, so that the pivot connections of the toggle links 37 and 40 will be shifted past the center line through the contacts 36 and 39, and consequently the springs 38 and 41 will then cause a flipping of the contacts 36 and 39 away from engagement with the contacts 34 and 35 to a position in which the contacts 36 and 39 engage stops 87 and 88. The circuit of the magnet 82 is thus opened and the valve 83 is permitted to unseat by the action of spring 84, and an application of the brakes is effected by the venting of fluid under pressure from the application valve device (not shown).

When an auxiliary governor device is employed, as shown in Fig. 1, the train may be controlled in accordance with two speed limits, for example, the primary governor device may operate at a low speed limit and the auxiliary governor device at a higher speed limit. In this case, means are provided, by which when the train is to operate at the low speed limit, the control by the auxiliary governor device is rendered ineffective and the apparatus operates with only the primary governor device effective, and operating as hereinbefore described.

If, however, the train is to operate at the higher speed limit, the auxiliary governor device is rendered effective to control the speed of the train, while the primary governor device is rendered ineffective. As the apparatus and circuit arrangements for accomplishing this action form no part of my invention, the same has not been shown in the drawings.

If it is desired to control the train at three different speed limits, an additional auxiliary governor device may be applied to the primary governor device at the side opposite that to which the auxiliary governor device is shown applied in Fig. 1.

When such additional auxiliary governor device is not used, a cover plate 89 is employed to close the opening in the housing 1, as shown in Fig. 1. Said plate is, of course, removed when the additional governor device is applied. A similar cover plate is provided for closing the other opening in the primary governor housing 1, in case the auxiliary governor device shown in Fig. 1 is not employed.

It will thus be seen that one, two, or three governor devices may be employed, as desired, so that the apparatus may be readily changed to suit the speed limit requirements in any installation.

Having now described my invention, what I claim as new and desire to secure by Letters Patent, is:—

1. In a speed governor mechanism, the combination with a driving axle, a driven shaft geared to said axle, and a speed governor carried and operated by said shaft, of an auxiliary driven shaft, a speed governor carried and operated by said shaft, and gears for operatively connecting said shaft for operating the auxiliary shaft from the axle driven shaft.

2. In a speed governor mechanism, the combination with a driving axle, a driven shaft geared to said axle, and a speed governor operated by said shaft, of an auxiliary driven shaft, a speed governor operated by said shaft, a shiftable gear carried by the first driven shaft, a gear carried by the second driven shaft, and gears operatively connecting the gears on the driven shaft in different positions of said shiftable gear.

3. In a speed governor mechanism, the combination with a primary governor device comprising a housing, a driving axle, a driven shaft operatively geared to said axle, and a speed governor operated by said shaft, of an auxiliary governor device comprising a housing adapted to be secured to the primary housing, a driven shaft, a governor operated by said driven shaft, and gears operatively connecting the auxiliary driven shaft to the primary driven shaft.

4. In a speed governor mechanism, the combination with a primary governor device comprising a driving axle, a driven shaft operatively geared to said axle, and a speed governor operated by said shaft, of an auxiliary governor device comprising a driven shaft, a speed governor operated by said shaft, a gear shiftable to two positions on the primary driven shaft, gear means for connecting the primary gear to the auxiliary gear in one position of the primary gear, and gear means for connecting the primary gear to the auxiliary gear in the other position of the primary gear.

5. In a speed governor mechanism, the combination with a primary governor device comprising a driving axle, a driven shaft operatively geared to said axle, a speed governor operated by said shaft, of an auxiliary speed governor device, gear means for driving said auxiliary governor device from the shaft of the primary governor device, including a gear on the primary driven shaft shiftable to two positions, and means for defining the two positions of said gear on the driven shaft.

6. In a speed governor mechanism, the combination with a primary governor device comprising a driving axle, a driven shaft operatively geared to said axle, a speed governor operated by said shaft, of an auxiliary speed governor device, gear means for driving said auxiliary governor device from the shaft of the primary governor device, including a gear on the primary driven shaft shiftable to two positions, means for defining the two positions of said gear on the driven shaft, and means for locking said gear in either of its two positions.

7. In a speed governor mechanism, the combination with a primary governor device comprising a driving axle, a driven shaft operatively geared to said axle, a speed governor operated by said shaft, of an auxiliary speed governor device, gear means for driving said auxiliary governor device from the shaft of the primary governor device, including a gear on the primary driven shaft shiftable to two positions, yielding means for defining the two different positions of said gear on the driven shaft, and means for locking said gear in either of its two positions.

8. In a speed governor mechanism, the combination with a primary governor device comprising a driving axle, a driven shaft operatively geared to said axle, a speed governor operated by said shaft, of an auxiliary governor device, gear means for driving said auxiliary governor device from the shaft of the primary governor device, including a gear on the primary driven shaft shiftable to two positions, and means for locking said gear in either of its two positions comprising a member adapted to be secured to the primary governor device in either of two positions and provided with an extension for engaging with a part carried by said gear to prevent movement of the gear on the shaft.

9. In a speed governor mechanism, the combination with a driving axle and a primary governor device comprising a housing, a driven shaft in said housing geared to said axle, and a speed governor operated by said shaft, of an auxiliary governor device comprising a housing, a driven shaft in said housing, a speed governor operated by said shaft, and gear means for operatively connecting the driven shaft of the auxiliary governor device to the driven shaft of the primary governor device, the housing of the auxiliary governor device having an opening adapted to register with an opening in the housing of the primary governor device, said gear means connecting said shafts through said openings.

10. In a speed governor mechanism, the combination with a driving axle, of a speed governor, a housing mounted on said axle, and containing said governor, a member secured to the vehicle and having an opening through which said axle extends and connected to said housing at a point adjacent to said speed governor for preventing rotative movement of the housing, and a flexible connection between said member and said housing for permitting relative movement of the housing with the axle with respect to the vehicle, other than rotative movement.

In testimony whereof I have hereunto set my hand.

CLYDE C. FARMER.